MANIFOLD IMAGING PROCESS

Original Filed Dec. 22, 1969

INVENTORS
IVAR T. KROHN
GEOFFREY A. PAGE

BY

Raymond C. Loyer

ATTORNEY

United States Patent Office 3,756,812
Patented Sept. 4, 1973

3,756,812
MANIFOLD IMAGING PROCESS

Ivar T. Krohn and Geoffrey A. Page, Rochester, N.Y., assignors to Xerox Corporation, Rochester, N.Y.
Continuation of abandoned application Ser. No. 887,201, Dec. 22, 1969. This application Jan. 14, 1972, Ser. No. 218,036
Int. Cl. B03g *5/00, 13/00*
U.S. Cl. 96—1 R 14 Claims

ABSTRACT OF THE DISCLOSURE

An imaging process wherein an electrically photosensitive imaging layer is exposed to electromagnetic radiation to which it is sensitive while the layer is subjected to an electric field. Subsequent to exposure, the imaging layer is activated so as to render the layer cohesively weak such that when it is sandwiched between a donor sheet and a receiver sheet and subjected to an electric field the imaging layer fractures in imagewise configuration upon separation of the sandwich.

This is a continuation of application Ser. No. 887,201, filed Dec. 22, 1969, now abandoned.

BACKGROUND OF THE INVENTION

The present invention relates in general to imaging and more specifically to an improved process for the formation of monochromatic images by layer transfer in image configuration.

Although color imaging techniques based on the transfer of an imaging layer have been known in the past, these techniques have always been difficult to operate because they depend on photochemical reactions and generally involve the use of distinct layer materials for the two functions of imagewise transfer and image coloration. A typical example of the complex structures and sensitive materials employed in prior art techniques is described in U.S. Pat. 3,091,529 to Buskes. A more comprehensive discussion of prior art imaging techniques based on layer transfer may be found in copending application Ser. No. 708,380, filed Feb. 26, 1968 in the U.S. Patent Office, now U.S. Pat. 3,707,368.

Copending application Ser. No. 708,380 describes an imaging system utilizing a manifold sandwich comprising an electrically photosensitive material between a pair of sheets. In this imaging system, an imaging layer is prepared by coating a layer of electrically photosensitive imaging material onto a substrate. In one form the imaging layer comprises a photosensitive material such as metal-free phthalocyanine dispersed in a cohesively weak insulating binder. This coated substrate is called the donor. When needed, the imaging layer is rendered cohesively weak. The process step of weakening the imaging layer is termed activation and in most cases the imaging layer is activated by contacting it with a swelling agent, solvent, or partial solvent for the imaging layer or by heating. This step may be eliminated, of course, if the layer retains sufficient residual solvent after having been coated on the substrate from a solution or paste or is sufficiently cohesively weak to fracture in response to electromagnetic radiation, normally visible light and electrical field. After activation a receiver sheet is laid over the surface of the imaging layer. An electrical field is then applied across this manifold sandwich while it is exposed to a pattern of light and shadow representative of the image to be reproduced. Upon separation of the donor substrate or sheet and receiver sheet, the imaging layer fractures along the lines defined by the pattern of light and shadow to which the imaging layer has been exposed. Part of the imaging layer is transferred to one of the sheets while the remainder is retained on the other sheet so that a positive image, that is, a duplicate of the original is produced on one sheet while a negative image is produced on the other.

Previously, the activation step was performed either before or during the exposure of the imaging layer to electromagnetic radiation. Thus, when a normally liquid activator was employed, the imaging layer was activated prior to being incorporated into the sandwich. In some instances a low melting point material is incorporated into the sandwich as an activating layer over the imaging layer. This sandwich is heated whereupon the activating layer liquifies and activates the imaging layer. Such a process is described in copending application Ser. No. 628,028 filed Apr. 3, 1967 in the U.S. Patent Office, now U.S. Pat. 3,598,581.

The above described imaging system is capable of producing images of high contrast and of good quality. However, the step of activating the imaging layer with a swelling agent or solvent prior to or during the exposure step makes the process undesirably complex. It would be desirable to activate the imaging layer at a point in time and space remote from that of the exposure step. The advantages of developing a latent image in an imaging layer are readily apparent. The layer can be handled, shipped by mail and handled by processing equipment much easier than after the imaging layer has been rendered cohesively weak by the application of an activator thereto. Thus, there is a continuing need for improvement in imaging systems to simplify the process.

SUMMARY OF THE INVENTION

It is, accordingly, an object of this invention to provide an imaging process overcoming the above noted disadvantages.

It is another object of this invention to provide an improved high-contrast layer transfer imaging process.

A further object of this invention is to provide an imaging process of the lowest possible order of complexity.

The basic physical property desired in the imaging layer is that it be frangible as prepared or after having been suitably activated. That is, the layer must be sufficiently weak structurally so that the application of electrical field combined with the action of actinic radiation on the electrically photosensitive materials will fracture the imaging layer. Further, the layer must respond to the application of field the strength of which is below that field strength which will cause electrical breakdown or arcing across the imaging layer. Another term for "cohesively weak," therefore, would be "field fracturable." The step of rendering the imaging layer fracturable is termed activation.

It has not been discovered that this basic physical property of being structurally fracturable in response to an electric field and a pattern of electromagnetic radiation need not be present during exposure of the imaging layer while it is subjected to an electric field. That is, during the exposure step the imaging layer need not be frangible as has been previously believed.

In accordance with the process of this invention, an electrically photosensitive imaging layer is exposed to electromagnetic radiation to which it is sensitive while it is subjected to an electric field. Subsequent to such exposure, the imaging layer is rendered cohesively weak by applying thereto an activator. When the desired physical property as described above is imparted to the imaging layer, it is incorporated into a sandwich configuration between a donor sheet and a receiver sheet and while subjected to an electric field the sandwich is separated whereby the imaging layer fractures in imagewise configuration with the exposed portions of the imaging layer adhering to one of the donor and receiver sheets and the unexposed portions of the imaging layer adhering to the other sheet.

In one form the process of this invention is performed by first providing an electrically photosensitive imaging layer sandwiched between a donor sheet and a receiver sheet, at least one of the sheets being transparent to electromagnetic radiation to be employed. The entire sandwich is then subjected to an electric field and while so subjected the imaging layer is exposed to an imagewise pattern of electromagnetic radiation to which the imaging layer is sensitive. After exposure the receiver sheet is removed from the manifold sandwich and the imaging layer is treated or activated so as to render it cohesively weak or structurally fracturable after which the manifold sandwich is reconstituted by replacing the receiver sheet over the activated imaging layer. The manifold sandwich is again subjected to an electric field of the same polarity or different and while so subjected the sandwich is separated whereupon the imaging layer fractures in imagewise configuration.

In another embodiment of this invention, an electrically photosensitive imaging layer is coated upon a donor sheet and subjected to an electric field without being incorporated into a manifold sandwich. This can be accomplished in several ways depending upon the type of material employed as the donor sheet. Thus, for example, when an insulating dielectric material is employed as a donor sheet the imaging layer coated thereon is subjected to an electric field by transmitting a static charge in the donor sheet. The electrically charged donor is then exposed to an imagewise pattern of electromagnetic radiation, activated and a receiver sheet is laid upon the imaging layer. An electric field is then applied across the manifold sandwich and when so applied the sandwich is separated thereby fracturing the imaging layer in imagewise configuration.

The imaging layer contains any suitable electrically photosensitive material. Typical organic materials include: quinacridones such as:

2,9-dimethyl quinacridone,
4,11-dimethyl quinacridone,
2,10-dichloro-6,13-dihydro-quinacridone,
2,9-dimethoxy-6,13-dihydro-quinacridone,
2,4,9,11-tetrachloro-quinacridone, and solid solutions of quinacridones and other compositions as described in U.S. Pat. 3,160,510;

carboxamides such as:

N-2″-pyridyl-8,13-dioxodinaphtho-(2,1-2′,3′)-furan-6-carboxamide,
N-2″-(1″,3″,5″)-triazyl-8,13-dioxodinaphtho-(2,1-2′,3′)-furan-6-carboxamide,
anthra-(2,1)-naphtho-(2,3-d)-furan-9,14-dione-7-(2′-methyl-phenyl)carboxamide;

carboxanilides such as:

8,13-dioxodinaphtho-(2,1-2′,3′)-furan-6-carbox-p-methoxy-anilide,
8,13-dioxodinaphtho-(2,1-2′,3′)-furan-6-carbox-p-methylanilide, triazines such as:

2,4-diamino-triazine,
2,4-di(1′-anthraquinonyl-amino)-6-(1″-pyrenyl)-triazine,
2,4-di(1′-anthraquinonyl-amino)-6-(1″-naphthyl)-triazine,
2,4-di(1′-naphthyl-amino)-6-(1′-perylenyl)-triazine,
2,4,6-tri(1′,1″,1‴-pyrenyl) triazine,
2,4,6-tri(1′,1″,1‴)-pyrenyl triazine;

benzopyrrocolines such as:

2,3-phthaloyl-7,8-benzo-pyrrocoline,
1-cyano-2,3-phthaloyl-7,8-benzopyrrocoline, 1-cyano-2,3-phthalocy-5-nitro-7,8-benzopyrrocoline,
1-cyano-2,3-phthaloyl-5-acetamido-7,8-benzo-pyrrocoline;

anthraquinones such as:

1,5-bis-(beta-phenylethylamino) anthraquinone,
1,5-bis-(3-methoxypropylamino) anthraquinone,
1,5-bis-(benzylamino) anthraquinone,
1,5-bis(phenylbutylamino) anthraquinone,
1,2,5,6-di(c,c′-diphenyl)-thiazole-anthraquinone,
4-(2′-hydroxyphenylmethoxyamino) anthraquinone;

azo compounds such as:

2,4,6-tris(N-ethyl-N-hydroxyethyl-p-aminophenylazo) phloroglucinol,
1,3,5,7-tetrahydroxy-2,4,6,8-tetra(N-methyl-N-hydroxyethyl-p-amino-phenylazo) naphthalene,
1,3,5-trihydroxy-2,4,6-tri(3′-nitro-N-methyl-N-hydroxymethyl-4′-aminophenylazo) benzene,
3-methyl-1-phenyl-4-(3′-pyrenylazo)-2-pyrazolin-5-one,
1-(3′-pyrenylazo)-2-hydroxy-3-naphthanilide,
1-(3′-pyrenylazo)-2-naphthol,
1-(3′-pyrenylazo)-2-hydroxypyrene,
1-(3′-pyrenylazo)-2-hydroxy-3-methyl-xanthene,
2,4,6-tris(3′-pyrenylazo) phloroglucinol,
2,4,6-tris(1′-phenanthrenylazo) phloroglucinol,
1-(3′-methoxy-5′-nitro-phenylazo)-2-hydroxy-3′-nitro-3-naphthanilide;

salts and lakes of compounds derived from 9-phenylxanthene, such as:

phosphotongstomolybdic lake of 3,6-bis-(ethylamino)-9,2′-carboxyphenyl xanthenonium chloride,
barium salt of 3-2′-toluidineamino-6-2″-methyl-4″-sulphophenyl-amino-9-2‴-carboxyphenylxanthene;
phosphomolybdic lake of 3,6-bis-(ethylamino)-2,7-dimethyl-9,2′-carbethoxyphenylxanthenonium chloride;

dioxazines such as:

2,9-dibenzoyl-6,13-dichloro-triphenodioxazine,
2,9-diacetyl-6,13-dichloro-triphenodioxazine,
3,10-dibenzopylamino-2,9-diisopropoxy-6,13-dichloro-triphenodioxazine,
2,9-difluroyl-6,13-dichlorotriphenodioxazine;

lakes of fluorescein dyes such as:

lead lake of 2,7-dinitro-4,5-dibromo fluorescein,
lead lake of 2,4,5,7-tetrabromo fluorescein,
aluminum lake of 2,4,5,7-tetrabromo-10,11,12,13-tetrachloro fluorescein;

bisazo compositions such as:

N,N′-di[1-(1′-naphthylazo)-2-hydroxy-8-naphthyl] adipdiamide,
N,N′-di-1-(1′-naphthylazo)-2-hydroxy-8-naphthyl succinidiamide,
bis-4,4′-(2″-hydroxy-8″-N,N′-diterephthala-mide-1-naphthylazo) biphenyl,
3,3′-methoxy-4,4′-diphenyl-bis (1″-azo-2″-hydroxy-3″-naphthanilide);

pyrenes such as:

1,3,6,8′-tetracyanopyrene,
1,3-dicyano-6,8-dibromo-pyrene,
1,3,6,8-tetraaminopyrene,
1-cyano-6-nitropyrenes;

phthalocyanines such as:

beta-form metal free phthalocyanine, copper phthalocyanines, tetrachloro phthalocyanine, the "x" form of metal-free phthalocyanine as described in U.S. Pat. 3,357,-989; metal salts and lakes of azo dyes, such as: calcium lake of 6 - bromo-1(1′-sulfo-2-naphthylazo)-2-naphthol, barium salt of 6-cyano-1(1′-sulfo-2-naphthylazo)-2-naphthol, calcium lake of 1-(2′-azonaphthalene - 1′ - sulfonic acid)-2-naphthol, calcium lake of 1-(3′-ethyl-5′-chloroazobenzene-2′-sulfonic acid)-2-hydroxy-3-naphthoic acid; and mixtures thereof.

Typical inorganic compositions include cadmium sulfide, cadmium sulfoselenide, zinc oxide, zinc sulfide, sulphur selenium, mercuric sulfide, lead oxide, lead sulfide, cadmium selenide, titanium dioxide, indium trioxide and the like.

In addition to the aforementioned organic materials, other organic materials which may be employed in the imaging layer include polyvinylcarbazole; 2,4-bis-(4,4′-diethyl-amino-phenyl) - 1,3,4 - oxidiazole; N-isopropylcarbazole and the like. Other electrically photosensitive materials useful in the process of this invention are listed in copending application Ser. No. 708,380, filed Feb. 26, 1968 which is incorporated herein by reference.

It is also to be understood that the electrically photosensitive particles themselves may consist of any suitable one or more of the aforementioned electrically photosensitive materials, either organic or inorganic, dispersed in, in solid solution in, or copolymerized with, any suitable insulating resin whether or not the resin itself is photosensitive. This particular type of particle may be particularly desirable to facilitate dispersion of the particle, to prevent undesirable reactions between the binder and the photosensitive material or between the photosensitive material and the activator and for similar purposes. Typical resins of this type include polyethylene, polypropylene, polyamides, polymethacrylates, polyacrylates, polyvinyl chlorides, polyvinyl acetates, polystyrene, polysiloxanes, chlorinated rubbers, polyacrylonitrile, epoxies, phenolics, hydrocarbon resins and other natural resins such as resin derivatives as well as mixtures and copolymers thereof.

The "x" form phthalocyanine is preferred because of its excellent photosensitivity although any suitable phthalocyanine may be used to prepare the imaging layer of this invention. The phthalocyanine used may be in any suitable crystal form. It may be substituted or unsubstituted both in the ring and straight chain portions. Reference is made to a book entitled "Phthalocyanine Compounds" by F. H. Moser and A. L. Thomas, published by the Reinhold Publishing Company, 1963 edition for a detailed description of phthalocyanines and their synthesis. As above noted, any suitable phthalocyanine may be used to prepare the photoconductive layer of the present invention. Typical phthalocyanines are listed in copending application Ser. No. 708,380 referred to above.

The imaging layer serves as the photoresponsive element of the system as well as the colorant for the final image produced. Preferably, the imaging layer is selected so as to have a high level of response which at the same time being intensely colored so that a high contrast image can be formed by the high gamma system of this invention. The imaging layer may be homogeneous comprising, for example, a solid solution of two or more pigments with one or more pigments being electrically photosensitive and at least one pigment being electrically photoinsensitive. The imaging layer may also be heterogeneous comprising, for example, pigment particles dispersed in a binder. The thickness of the imaging layer whether homogeneous or heterogeneous ranges from about 0.2 micron to about 10 microns generally about 0.5 micron to about 5 microns and preferably about 2 microns.

A visible light source, an ultraviolet light source or any other suitable source of electromagnetic radiation may be used to expose the imaging layer of this invention. The electrically photosensitive material is chosen so as to be responsive to the wavelength of the electromagnetic radiation used. It is to be noted that different electrically photosensitive materials have different spectral responses and that the spectral response of many electrically photosensitive materials may be modified by dye sensitization so as to either increase or narrow the spectral response of a material to a peak or to broaden it to make it more panchromatic in its response.

The ratio of photosensitive pigment to binder by volume in the heterogeneous system may range from about 10 to 1 to about 1 to 10 respectively but it has generally been found that proportions in the range of from about 1 to 4 to 2 to 1 respectively produce the best results and, accordingly, this constitutes a preferred range.

The binder material in the heterogeneous imaging layer or the material used in conjunction with the pigment materials in the homogeneous layer, where applicable, may comprise any suitable cohesively weak insulating material or materials which can be rendered cohesively weak. Typical materials include: microcrystalline waxes such as: Sunoco 1290, Sunoco 5825, Sunoco 985, all available from Sun Oil Co.; Paraflint RG, available from the Moore and Munger Company; paraffin waxes such as: Sunoco 5512, Sunoco 3425, available from Sun Oil Co.; Sohio Parawax available from Standard Oil of Ohio; waxes made from hydrogenated oils such as: Capitol City 1380 wax, available from Capitol City products Co., Columbus, Ohio; Caster Wax L–2790, available from Gaker Caster Oil Co.; Vitikote L–304, available from Duro Commodities; polyethylene such as: Eastman Epolene N–11, Eastman Epolene C–12, available from Eastman Chemical Products Co.; Polyethylene DYJT, Polyethylene DYLT, Polyethylene DYNF, Polyethylene DYDT, all available from Union Carbide Corp.; Marlex TR 822, Marlex 1478, available from Phillips Petroleum Co.; Epolene C–13, Epolene C–10, available from Eastman Chemical Products Co.; Polyethylene AC8, Polyethylene AC612, Polyethylene AC324, available from Allied Chemicals; modified styrenes such as: Piccotex 75, Piccotex 100, Piccotex 120, available from Pennsylvania Industrial Chemical; Vinylacetate-ethylene copolymers such as: Elvax Resin 210, Elvax Resin 310, Elvax Resin 420, available from E. I. du Pont de Nemours & Co., Inc. Vistanex MH, Vistanex L–80, available from Enjay Chemical Co.; vinyl chloride-vinyl acetate copolymers such as: Vinylite VYLT, available from Union Carbide Corp.; styrene-vinyl toluene copolymers; polypropylenes; and mixtures thereof. The use of an insulating binder is preferred because it allows the use of a larger range of electrically photosensitive pigments.

A mixture of microcrystalline wax and polyethylene is preferred because it is cohesively weak and an insulator.

The activation step may taken many forms such as heating the imaging layer thus softening it or applying a substance to the surface of the imaging layer or including a substance in the imaging layer which substance lowers the cohesive strength of the layer or aids in lowering the cohesive strength. The substance so employed in termed an "activator." Preferably, the activator should have a high resistivity so as to prevent electrical breakdown of the manifold sandwich. Accordingly, it will generally be found to be desirable to purify commercial grades of activators so as to remove impurities which might impart a higher level of conductivity. This may be accomplished by running the fluids through a clay column or by employing any other suitable purification technique. Generally speaking, the activator may consist of any suitable material having the aforementioned properties. For purposes of this specification and the appended claims, the term activator shall be understood to include not only materials which are conventionally termed solvents but also those which are partial solvents, swelling agents or softening agents for the imaging layer.

It is generally preferable that the activator have a relatively low boiling point so that fixing of the resulting image can be accomplished upon evaporation of the activator. If desired, fixing of the image can be accomplished more quickly with mild heating at most. It is to be understood, however, that the invention is not limited to the use of these relatively volatile activators. In fact, very high boiling point non-volatile activators including silicone oils such as dimethyl-polysiloxanes and very high boiling point long chain aliphatic hydrocarbon oils ordinarily used as transformer oils such as Wemco-C transformer oil, available from Westinghouse Electric Co., have also been successfully utilized in the imaging process. Although these less volatile activators do not dry off by evaporation, image fixing can be accomplished by contacting the final image with an absorbent sheet as paper which absorbs the activator fluid. In short, any suitable volatile or non-volatile activator may be employed. Typical activators include Sohio Odorless Solvent 3440, an aliphatic (kerosene) by hydrocarbon fraction, available from Standard Oil Co. of Ohio, carbon tetrachloride, petroleum ether, Freon 214 (tetrafluorotetrachloropropane), other halogenated hydrocarbons such as chloroform, methylene chloride, trichloroethylene, perchloroethylene, chlorobenzene, trichloromonofluoromethane, tetrachlorodifluoroethane, trichlorotrifluoroethane, ethers such as diethyl ether, diisopropyl ether, dioxane, tetrahydrofuran, ethyleneglycol monoethyl ether, aromatic and aliphatic hydrocarbons such as benzene, toluene, xylene, hexane, cyclohexane, gasoline, mineral spirits and white mineral oil, vegetable oils such as coconut oil, babussu oil, palm oil, olive oil, castor oil, peanut oil and neatsfoot oil, decane, dodecane and mixtures thereof. Sohio Odorless Solvent 3440 is preferred because it is odorless, non-toxic and has a relatively high flash point.

A preferred class of activators is a "thermo-solvent." A "thero-solvent" is an ingredient in the electrically photosensitive imaging layer which is solid at ordinary room temperatures but which melts slightly above room temperature. When melted this material is a solvent or at least a partial solvent or swelling agent for the imaging layer. By employing a thermo-solvent and heating the manifold sandwich, the liquid renders the imaging layer cohesively weak and capable of cleaving sharply along the edges of the imagewise pattern to which the imaging layer has been exposed.

The thermo-solvents useful in the process of this invention are low-melting materials which are solid at room temperature but melt at a temperature below that of the lowest melting point material of the imaging layer.

Preferred thermo-solvents are those which melt at temperatures below 175° F. Particularly good results are obtained with long chain petroleum waxes with from about 18 to about 30 carbon atoms in a chain. Typical low melting waxes include octadecane, nonadecane, eicosane, heneicosane, docosane, tricosane, tetracosane, pentacosane, hexacosane, heptocosane, octacosane, nonacosane triacontane, and mixtures thereof. If desired, these low melting waxes may be mixed with other materials such as higher melting waxes. Typical thermo-solvents which can be dispersed in a binder or used alone where suitable include m-terphenyl, chlorinated terphenyl, perchloro hydrocarbons, polybutylenes, biphenyl and mixtures thereof. The thermo-solvents can be mixed with suitable binders when desired and such binders include the low melting waxes described above in the imaging layer binder materials listed above.

In a preferred embodiment, the thermo-solvent is incorporated into the imaging layer by physically mixing the electrically photosensitive material with the solid particulate thermo-solvent.

The means employed to provide heat activation may take many forms. A heated platen upon which the manifold sandwich rests may be employed or a pair of heated rollers through which the manifold sandwich passes may be employed. In some instances a current of heated air impinging upon the manifold sandwich may be employed to provide the necessary heat to activate the imaging layer. Other means of providing heat will occur to those skilled in the art.

When the imaging layer is activated by means of applying a liquid to its surface, the electric field is preferably temporarily discontinued. The field can be reestablished after activation. In some cases the time required for activating an imaging layer is greatly extended if the liquid activator is applied to the surface of an imaging layer which is under the influence of an electric field.

BRIEF DESCRIPTION OF THE DRAWINGS

The advantages of this improved method of imaging will become apparent upon consideration of the disclosure of the invention, especially when taken in conjunction with the accompanying drawings wherein.

DETAILED DESCRIPTION OF THE DRAWINGS

Figures 1, 2, 3, 4, 5:
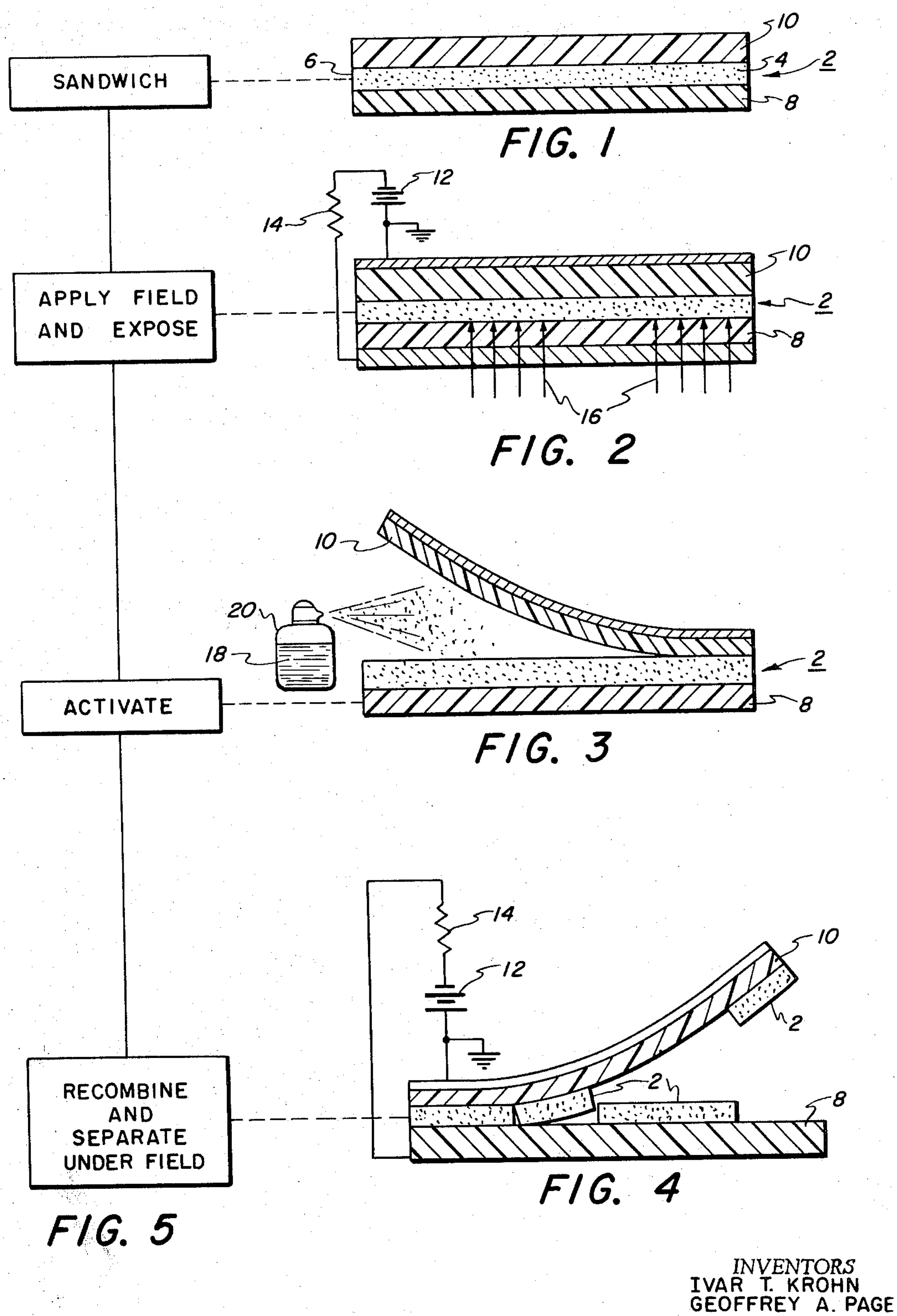
FIG. 1 is a side sectional view of a photosensitive imaging member for use in this invention.
FIG. 2 is a side sectional view diagrammatically illustrating the process steps of applying an electric field to the imaging member and exposing the imaging layer to a pattern of electromagnetic radiation to which the layer is sensitive.
FIG. 3 is a side sectional view diagrammatically illustrating the step of activating the imaging layer.
FIG. 4 is a side sectional view diagrammatically illustrating the separation of the imaging member under an electric field.
FIG. 5 is a process flow diagram of the method steps of this invention.

Referring now to FIG. 1, imaging layer 2 comprising photosensitive particles 4 dispersed in binder 6 is deposited on donor substrate 8. The image receiving portion of the imaging member comprises receiver sheet 10. In this embodiment either or both sheets 8 and 10 are at least partially transparent so as to permit exposure of imaging layer 2. Also, in the embodiment of this invention shown in FIG. 1, both of sheets 8 and 10 are insulating.

Referring now to FIG. 2, which diagrammatically illustrates the process of this invention wherein the imaging layer is exposed to electromagnetic radiation, there is shown a source of electrical potential 12 which supplies an electric field through resistor 14 to electrodes which are in the form of conductive backing for sheets 8 and 10. Electromagnetic radiation 16 such as visible light is projected from an original image through the transparent donor sheet 8 so as to expose imaging layer 2.

Referring now to FIG. 3, the imaging member is opened by lifting receiver sheet 10 from imaging layer 2 and although not shown this step may be performed with the electrical field applied or not applied. Activator fluid 18 is shown being sprayed upon imaging layer 2 of the imaging member from container 20. Alternatively, the activator may be applied by any suitable technique such with a brush, with a smooth or rough surfaced roller, by flow coating or the like. The activator serves to swell or otherwise weaken or thereby lower the cohesive strength of imaging layer 2 rendering the layer structurally fracturable in imagewise configuration in response to an applied field and the pattern of electromagnetic radiation to which it has previously been exposed.

Referring now to FIG. 4, there is shown diagrammatically the development of the image after the image has been suitably activated. Development is accomplished by applying an electric field from power source 12 through resistor 14 as was done previously. Alternatively, the polarity of this field can be reversed. However, in most cases the polarity will remain the same. Once the electric field is applied to the closed imaging member, the imaging member is reopened by separating donor sheet 8 from receiver sheet 10 whereby imaging layer 2 fractures along edges of exposed areas and separates from the donor sheet. Accordingly, once separation is complete, the exposed portions of imaging layer 2 are retained on one of the layer 8 or 10 while unexposed portions are retained on the other layer. Although FIG. 4 shows a positive image being formed on the donor sheet, it is possible to form a negative image on the donor sheet. Once the activator fluid has evaporated in the air or by blowing hot air across the surface of the image, imaging layer 2 is found well fixed on sheet 8.

Although the attached drawing illustrated the process of this invention employing electrodes, static electric charges can be employed thereby eliminating the need for electrodes. That is, when insulating donor and receiver sheets are employed, a static electric change can be placed on the sheets which charge is employed during the exposure step and also for the separation step.

DESCRIPTION OF THE PREFERRED EMBODIMENTS

The following examples further specifically illustrate the present invention. The examples below are intended to illustrate various preferred embodiments of the improved imaging method. The parts and percentages are by weight unless otherwise indicated.

Example I

A commercial metal-free phthalocyanine is first purified by o-dichlorobenzene extraction to remove organic impurities. Since this extraction step yields the less sensitive beta crystalline form, the desired "x" form is obtained by dissolving about 100 grams of beta in approximately 600 cc. of sulfuric acid, precipitating it by pouring the solution in about 3000 cc. of ice water and washing with water to neutrality. The thus purified alpha phthalocyanine is then salt milled for six days and desalted by slurrying in distilled water, vacuum filtering, water washing and finally methanol washing until the final filtrate is clear. After vacuum drying to remove residual methanol, the "x" form phthalocyanine thus produced is used to prepare the imaging layer according to the following procedure: About 5 grams of the "x" form phthalocyanine is added to about 5 grams of Algol Yellow GC, 1,2,5,6-di-(C,C'-diphenyl) thiazole-anthraquinone, C.I. No. 67300, available from General Dyestuffs, and about 2.8 grams of purified Watchung Red B, 1-(4'-methyl-5'-chloroazobenzene - 2' - sulfonic acid) - 2 - hydroxy-3-naphthoic acid, C.I. No. 15865, available from E. I. du Pont de Nemours & Co., which is purified as follows: Approximately 240 grams of the Watchung Red B is slurried in about 2400 milliliters of Sohio Odorless Solvent 340, a mixture of kerosene fractions available from the Standard Oil Company of Ohio. The slurry is then heated to a temperature of about 65° C. and held there for about ½ hour. The slurry is then filtered through a glass sintered filter. The solids are then reslurried with petroleum ether (90 to 120° C.) and filtered through a glass filter. The solids are then dried in an oven at about 50° C.

About eight grams of Sunoco Microcrystalline Wax Grade 5825 having an ASTM-D-127 melting point of 151° F. and about two grams Paraflint R.G., a low molecular weight paraffinic material, available from the Moore and Munger Company, New York City, and about 320 milliliters of petroleum ether (90 to 120° C.) and about 40 milliliters of Sohio Odorless Solvent 3440 are placed with the pigments in a glass jar containing ½ inch flint pebbles. The mixture is then milled by revolving the glass jar at about 70 r.p.m. for about 16 hours. The mixture is then heated for approximately two hours at about 45° C. and allowed to cool to room temperature. The mixture is then ready for coating on the donor substrate. The paste-like mixture is then coated in subdued green light on 2 mil Mylar (a polyester formed by the condensation reaction between ethylene glycol and terephthalic acid available from E. I. du Pont de Nemours & Co., Inc.) with a No. 26 wire wound drawdown rod to produce a coating thickness when dried of approximately 7½ microns. The coating is then dried in the dark. The coated Mylar sheet is passed between a pair of conductive aluminum rollers which are connected to a D.C. power supply of about 10,000 volts. The aluminum rollers contact the surface of the imaging layer and the lower surface of the donor sheet. To prevent arcing, the donor sheet width is about ½-inch greater than the width of the aluminum rollers. For example, if approximately 3 inch rollers are used, a donor sheet of about 3½-inches width is employed. The ¼-inch overlap on each of the electrodes prevents sparking between the rollers. The charged donor is then placed on a glass plate with the imaging layer facing away from the plate. The imaging layer is exposed with a white incandescent light using a 30 watt Bell & Howell Headliner Model 70820 slide projector having a variable aperture placed in front of it. The light incident on the imaging layer is adjusted to approximately 5 foot-candles. The imagewise exposure continues for 2 seconds resulting in a total exposure of 1 foot-candle second. After exposure, the imaging layer is activated by applying a coating of Sohio Odorless Solvent 3440 by means of a wide camel's hair brush saturated with the solvent. A sheet of aluminized paper is then lowered into contact with the imaging layer to act as a receiver and is applied with light pressure to remove excess solvent. The aluminized paper and the side of the charged donor sheet opposite the imaging layer are interconnected by means of an electrically conductive material. While connected, the receiver sheet is then peeled from the imaging layer whereupon the imaging layer fractures yielding a pair of excellent quality images with a positive image adhering to the receiver sheet and a negative image adhering to the donor sheet.

Example II

About 5 parts of Sunoco 1290, a microcrystalline wax with a melting point of about 178° F., available from the Sun Oil Company, is dissolved in about 100 parts of reagent grade petroleum ether. To this solution is added about 5 parts of finely divided x-form metal-free phthalocyanine produced by the process described in Example I above. This paste is then placed in a ball mill jar with clean porcelain balls. The formulation is then ball milled for about 3½ hours at about 70 r.p.m. After milling, about 20 parts of Sohio Odorless Solvent 3440 is added to the paste. This paste is then coated onto a 2 mil Mylar donor sheet with a No. 36 wire wound rod which produces a coating of about 7½ microns after drying. A mixture of about 2.5 parts eicosane (technical grade, a mixture of predominately straight chain hydrocarbons averaging 20 carbon atoms to the molecule) and about 7.5 parts Sunoco 5825, a petroleum wax, are suspended in about 100 parts Sohio Odorless Solvent 3440 and applied to a 2 mil Mylar receiving sheet. A No. 12 wire wound drawdown rod is used which produces a 2.5 micron thick coating on a Mylar receiving sheet. The coated surface of the Mylar receiving sheet is then brought into surface contact with the phthalocyanine containing layer on the Mylar donor sheet. The donor side of the resulting manifold set is then placed against the conductive coating on a NESA glass plate. The positive ground terminal of the 10,000 volt D.C. power supply is then connected to the NESA coating in series with a 5,500 megohm resistor and the negative terminal is connected to the black opaque electrode. With the voltage applied, a white incandescent light image is projected through the NESA glass onto the photosensitive layer. Exposure is about 0.2 foot-candles for about two seconds. After the exposure a 15 volt A.C. power supply connected to the NESA coating is activated, heating the set to about 150° F. by resistance in the NESA coating. At this temperature, the thin layer of eicosane in Sunoco 5825 melts. After heating the receiver sheet is peeled from the set with the potential source still connected. A pair of excellent quality images with a duplicate of the original on the donor sheet and a reversal of the original on the receiver sheet are produced.

Examples III–VI

The procedure of Example II is repeated for each of these examples except that in place of the 5 parts phthalocyanine, the following photosensitive materials are used: for Example III, about 6 parts Algol Yellow GC, C.I. No. 67300, 1,2,5,6-di(C,C'-diphenyl)-thiazole-anthraquinone, available from General Dye Stuffs; for Example IV, about 6 parts Watchung Red B, C.I. No. 15865, 1-(4'-methyl-5'-chloroazobenzene-2'-sulfonic acid)-2-hydroxy-3-naphthoic acid, available from E. I. du Pont de Nemours & Company; for Example V, about 5 parts N-2"-pyridyl-8,13-dioxodinaphtho-(1,2-2',3')-furan - 6 - carboxamide, prepared as described in copending application Ser. No. 421,281, filed Dec. 28, 1964; and for Example VI, about 6 parts Monolite Fast Blue GS, the alpha form of metal-free phthalocyanine, available from Arnold Hoffman Company. In each case an excellent image conforming to the original results. The image produced in Examples II and VI are cyan in color, Examples III and V produce yellow images and Example IV a magenta image.

Examples VII–IX

The procedure of Example II is followed, except that in these examples the eicosane-Sunoco 5825 heat activatable layer is replaced by other materials.

In Example VII this layer consists of about 5 parts docosane mixed with about 5 parts Sunoco 5825. This layer is coated directly over the phthalocyanine-Sunoco 1290 layer and a NESA glass plate is placed over the thus formed layer. The resulting manifold set is then imaged as in Example II, producing a good image conforming to the original.

In Example VIII, technical grade heptacosane is coated from a solution in n-hexane onto the receiving sheet surface to a dry thickness of about 2 microns. The resulting manifold set is heated to about 145° F. after imaging as in Example II. An excellent image results.

In Example IX, a mixture of about 4 parts Aroclor 5442 a chlorinated terphenyl available from Monsanto Co. and about 6 parts Sunoco 5512 are coated onto the receiving sheet surface as in Example II. The manifold set is heated to about 160° F. after imaging. A good image corresponding to the original results.

Example X

A donor sheet prepared as described in Example I is laid upon a NESA electrode which is attached to the positive side of a 9,000 volt D.C. power supply. An aluminum foil receiver is laid over the imaging layer and connected to the negative ground side of the power supply. The power supply is engaged placing a field across the imaging layer between the aluminum receiver and the NESA glass. While the field is held across the sandwich, the imaging layer is exposed to a pattern of electromagnetic radiation from a white light source in the amount of 2 foot-candle seconds. With the field discontinued by grounding the electrodes, the aluminum receiver is peeled from the imaging layer whereupon the exposed imaging layer is activated by the application thereto of kerosene by means of a brush. The aluminum receiver is replaced over the imaging layer and rolled flat with a rubber roller using hand pressure to squeeze out any excess activator. After a delay of about 1 minute and with the field reapplied, the aluminum receiver is again peeled from the imaging layer thereby fracturing the imaging layer as a portion of the imaging layer conforming to the negative image of the pattern to which it was exposed adheres to the aluminum receiver while a positive image adheres to the donor sheet. The images are both fixed by evaporating the kerosene with a hot air gun.

Example XI

The procedure of Example II is repeated with the exception that the heating means is replaced by directing a stream of hot air against the receiver sheet. After a few minutes of heating by means of a hot air gun, the receiver sheet is peeled from the donor revealing a positive image on the donor while a negative image adheres to the receiver.

Example XII

The procedure of Example II is repeated with the exception that after the exposure of the imaging layer the imaging member is placed in contact with a roller heated to about 200° F and immediately upon passing under the heated roller the receiver is removed from the donor. Residual electrical charges in the donor and receiver sheet supply the electrical field upon separation of the imaging member whereupon there is found a negative image adhering to the receiver sheet and a positive image adhering to the donor sheet.

Although specific components and proportions have been stated in the above description of preferred embodiments of the manifold set used in the process of this invention, other suitable materials as listed above, may be used with similar results. In addition, other materials may be added to the various elements of the manifold set to synergize, enhance or otherwise modify their properties. For example, colorants, spectral or electrical sensitizers or conductivity modifying ingredients may be added to the donor substrate imaging layer or receiving sheet where desired.

Other modifications and ramifications of the present invention will occur to those skilled in the art upon a reading of the present disclosure. These are intended to be included within the scope of this invention.

What is claimed is:

1. An imaging process comprising the steps of exposing an electrically photosensitive imaging layer to an imagewise pattern of electromagnetic radiation to which the imaging layer is sensitive while said layer is subjected to an electric field, said imaging layer being non-fracturable to the combined effects of said exposure and field, subsequent to said exposure activating said imaging layer by applying thereto an activator whereby said imaging layer is rendered structurally fracturable in response to an electric field and said exposure to electromagnetic radiation to which said layer is sensitive, fracturing said imaging layer in imagewise configuration by sandwiching said imaging layer between a donor sheet and a receiver sheet and while said sandwich is subjected to an electric field separating said receiver sheet from said donor sheet.

2. The process of claim 1 wherein said activator is a liquid which is a partial solvent for said imaging layer.

3. The process of claim 1 wherein said sandwich contains a layer comprising a thermo-solvent for said imaging layer in contact with said imaging layer and said activation of said imaging layer is accomplished by heating said thermo-solvent above its melting point.

4. The method of claim 3 wherein said heat is supplied by contacting said sandwich with a hot roller.

5. The method of claim 3 wherein the heat is supplied by contacting at least one of said donor and said receiver sheets with hot air.

6. An imaging method which comprises the steps of:

(a) providing a manifold set comprising a donor substrate having coated thereon an electrically photosensitive imaging layer said layer being nonfracturable in response to the effects of the combined effects of an applied electrical field and exposure to electromagnetic radiation to which it is sensitive and a receiver sheet over said imaging layer, at least one of said donor and receiver sheets being at least partially transparent to electromagnetic radiation to which said imaging layer is sensitive;

(b) exposing said imaging layer to a pattern of electromagnetic radiation to which it is sensitive while said sandwich is subjected to an electric field;

(c) separating said receiver sheet from said imaging layer and applying to said imaging layer an activator whereby said imaging layer is rendered structurally fracturable in response to an electric field and said exposure to electromagnetic radiation to which it is sensitive;

(d) placing a receiver sheet in contact with said activated imaging layer; and (e) while applying an electric field across said donor and receiver sheets separating said sheets whereby the imaging layer fractures in imagewise configuration with the negative image adhering to one of the donor and receiver sheets and a positive image adhering to the other sheet.

7. The process of claim 6 wherein said activator is a liquid which is at least a partial solvent for said imaging layer.

8. An imaging method which comprises the steps of:

(a) providing an electrically insulating donor sheet having coated thereon an electrically photosensitive imaging layer said layer being nonfracturable to the combined effects of an applied electrical field and exposure to electromagnetic radiation to which it is sensitive;

(b) placing a static electric charge in said donor sheet and exposing said imaging layer to a pattern of electromagnetic radiation to which it is sensitive;

(c) applying an activator to said imaging layer whereby said imaging layer is rendered structurally fracturable in response to an electric field and said electromagnetic radiation to which it is sensitive;

(d) forming a manifold set by contacting said imaging layer with a receiver sheet; and (e) while subjecting said set to an electric field separating said receiver sheet from said donor sheet whereby said imaging layer fractures in imagewise configuration.

9. The method of claim 1 wherein the electric field is in the range of from about 1,000 to about 7,000 volts per mil.

10. The method of claim 6 wherein the electric field is in the range from about 1,000 to about 7,000 volts per mil.

11. The method of claim 8 wherein the electric field is in the range of from about 1,000 to about 7,000 volts per mil.

12. The process of claim 3 wherein the thermosolvent comprises a long chain petroleum wax having from about 18 to about 30 carbon atoms in the chain.

13. The process of claim 12 wherein the thermosolvent is eicosane.

14. The method of claim 12 wherein said heat is supplied by contacting said sandwich with a hot roller.

References Cited

UNITED STATES PATENTS

| | | | |
|---|---|---|---|
| 3,227,076 | 1/1966 | Castle | 101—149.4 |
| 3,510,419 | 5/1970 | Carriera et al. | 204—181 |
| 3,512,968 | 5/1970 | Tulogin | 96—1.2 |
| 3,598,581 | 8/1971 | Reiners | 96—1 |

NORMAN G. TORCHIN, Primary Examiner

J. R. MILLER, Assistant Examiner

U.S. Cl. X.R.

96—1.5, 1.8; 117—37, 201, 215, 218